(12) United States Patent
Bender et al.

(10) Patent No.: US 8,105,680 B2
(45) Date of Patent: Jan. 31, 2012

(54) MULTI-LAYER SLIP FILM FOR PRINTING AND LAMINATION PROCESSES

(75) Inventors: Eric W. Bender, Fairport, NY (US); George F. Cretekos, Farmington, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 511 days.

(21) Appl. No.: 12/099,475

(22) Filed: Apr. 8, 2008

(65) Prior Publication Data
US 2009/0252902 A1    Oct. 8, 2009

(51) Int. Cl.
B32B 3/00 (2006.01)
B32B 7/06 (2006.01)
B32B 7/10 (2006.01)

(52) U.S. Cl. ........ 428/200; 428/220; 428/332; 428/446; 428/447; 428/484.1; 428/500; 428/913.3

(58) Field of Classification Search .......... 428/200, 428/220, 332, 446, 447, 484.1, 500, 913.3
See application file for complete search history.

(56) References Cited

U.S. PATENT DOCUMENTS

| | | | |
|---|---|---|---|
| 4,479,432 A | 10/1984 | Masaki et al. | |
| 4,654,252 A | 3/1987 | Doyen | |
| 5,463,491 A | 10/1995 | Check, III | |
| 5,463,492 A | 10/1995 | Check, III | |
| 5,728,251 A | 3/1998 | Check, III | |
| 5,804,169 A | 9/1998 | Ramin | |
| 5,866,111 A | 2/1999 | Felardos et al. | |
| 6,074,762 A * | 6/2000 | Cretekos et al. | 428/516 |
| 6,087,015 A | 7/2000 | Cretekos et al. | |
| 6,114,405 A | 9/2000 | Zhuang et al. | |
| 6,287,700 B1 | 9/2001 | Kong et al. | |
| 6,322,894 B1 | 11/2001 | Harley et al. | |
| 6,472,077 B1 | 10/2002 | Cretekos et al. | |
| 6,576,329 B2 | 6/2003 | Kong | |
| 6,682,822 B2 | 1/2004 | Cretekos et al. | |
| 6,703,141 B1 | 3/2004 | Lu et al. | |
| 6,749,898 B2 | 6/2004 | Nakamura et al. | |
| 6,899,949 B2 | 5/2005 | Imono et al. | |
| 2002/0064646 A1 * | 5/2002 | Cretekos et al. | 428/331 |
| 2004/0053066 A1 * | 3/2004 | Cretekos et al. | 428/515 |
| 2004/0209070 A1 | 10/2004 | Sheppard et al. | |
| 2007/0149074 A1 * | 6/2007 | Kong et al. | 442/79 |

FOREIGN PATENT DOCUMENTS

| | | |
|---|---|---|
| JP | 4 212 848 | 8/1992 |
| WO | WO 99/42281 | 8/1999 |
| WO | WO 99/59818 | 11/1999 |
| WO | WO 2005/102691 | 11/2005 |
| WO | WO 2007/111777 | 10/2007 |

OTHER PUBLICATIONS

"The Development of the CIE 2000 Colour-Difference Formula: CIEDE2000", M. R. Luo et al., Color Research and Application, vol. 26, No. 5, Oct. 2001.

* cited by examiner

*Primary Examiner* — Betelhem Shewareged
(74) *Attorney, Agent, or Firm* — Kevin M. Faulkner; Darryl M. Tyus

(57) ABSTRACT

A heat sealable, multi-layer film structure for multi-color printing or lamination processes and method for making the same are provided. The multi-layer film structure may include a core layer comprising a thermoplastic polymer and essentially no migratory slip agents; a functional layer on a first side of the core layer, wherein the functional layer is a printable layer or a laminatable layer; and a heat sealable skin layer on a second side of the core layer, the heat sealable skin layer comprising a thermoplastic polymer and a slip system. The multi-layer film structure is prepared without any migratory slip additives. Without migratory slip additives, the multi-layer film structure exhibits excellent machinability on typical packaging equipment.

10 Claims, No Drawings

MULTI-LAYER SLIP FILM FOR PRINTING AND LAMINATION PROCESSES

FIELD OF THE INVENTION

Embodiments of the present invention generally relate to heat-sealable multi-layer films for multi-color print processes.

BACKGROUND OF THE INVENTION

Film machinability refers to the rate at which a film may pass through packaging equipment without jamming. Film machinability may be tested by a "force over forming collar" test, wherein a film is pulled over a forming collar with force, and the force is recorded. The higher the force needed, the less machinable the film. Film machinability may also be tested by a "hot slip" test, wherein the back-seal bar of a packaging machine is heated up to 290° F. (116° C.), closed, and the film is pulled over the forming collar with force. Again, the more force that is necessary, the less machinable the film.

For heat-sealable films, other important properties are sealability and hot tack. Film sealability is usually measured in terms of a minimum sealing temperature (MST). The lower the minimum sealing temperature of the film, the broader the range of temperature that may be used to seal the film. "Hot Tack" is the strength of a heat seal immediately after sealing while still in a hot condition, i.e. before it has cooled down to ambient temperature and achieved its final strength.

Unmodified heat-sealable films typically have an inherently high coefficient of friction (COF) and film-to-film blocking properties. Therefore, slip additives and antiblocking particulates are traditionally added to the film structure to lower the COF and provide improved machinability to produce, for example, food packages.

In multi-layered film structures, slip additives are typically added to the core layer and permitted to migrate toward the skin layer. Such migration is dependent on time, temperature and pressure. Typical slip additives are polymers of fatty acid amides, such as erucamide or oleamide. Fatty acid amide slip systems, however, have reduced functionality when the multi-layer film is laminated to other non-slip containing films or substrates; as a result, the COF increases after lamination. Therefore, the production and functionality of fatty acid amide slip systems is limited.

Improved COF and slip functionality may be achieved using polydimethyl siloxane ("PDMS") to the skin layer of a multi-layer film. Immediately upon winding a multi-layer film with one skin layer containing PDMS, the PDMS is transferred to the opposite side of the multi-layer film structure and it is lubricated. Therefore, it is relatively easy to obtain a multi-layer film with excellent slip performance on both sides when PDMS is incorporated into the skin layer of a multi-layer film. Multi-layer films containing an appropriately low concentration of PDMS also tend to perform well and maintain a low COF during lamination and when formed into a package on packaging machines.

In some instances, however, certain converting steps for a multi-layer film that employs a PDMS slip system on a multi-layer film surface is difficult. As noted above, the PDMS transfers from one surface of the multi-layer to the opposite surface upon winding of the film on a spool or roll. The surface having the PDMS transferred thereon becomes contaminated and consequently makes printing and ink adhesion more difficult. Additionally, if printing and laminating are done in two sequential steps, i.e., out-of-line, then PDMS may also transfer to the surface of the ink and cause future lamination bonding strengths to be low or inconsistent.

Therefore, there is a need for a heat-sealable multi-layer film structure having improved machinability using a slip system combined with improved print performance and improved laminations performance. The instant invention meets this and other needs.

SUMMARY OF THE INVENTION

A heat sealable, multi-layer film structure for multi-color printing or lamination processes and method for making the same are provided. In at least one specific embodiment, the multi-layer film structure may include a core layer comprising a thermoplastic polymer and essentially no migratory slip agents; a functional layer, wherein the functional layer is a printable layer or a laminatable layer; and a heat sealable skin layer on a side of the core layer opposite the functional layer, the heat sealable skin layer comprising a thermoplastic polymer and a slip system. The thermoplastic polymer may include at least 60 wt % of propylene derived units. The slip system may include at least one of (A) a silicone gum comprising less than or equal to 1500 ppmw of the sealant skin layer, (B) a wax which comprises less than or equal to 10 wt % of the sealant skin layer, or (C) a combination of the silicone gum and the wax, wherein the silicone gum comprises less than or equal to 1500 ppmw of the sealant skin layer and the wax comprises less than or equal to 10 wt % of the sealant skin layer. The heat sealable skin layer may have a kinetic coefficient of friction of the sealant skin layer to itself of less than or equal to 0.30 when measured in accordance to ASTM D1894 as described herein (using 200 g sled); and a minimum sealing temperature range from 185 of to less that or equal to 240° F. (85 to 116° C.) when measured in accordance to the MST test method described herein. Essentially none of the slip system is transferred to the functional layer during multi-layer film processing (e.g., winding/unwinding the multi-layer film on a spool or roll.

In at least one specific embodiment, the heat sealable multi-layer film for multi-color printing or lamination processes may be formed by coextruding: (i) a core layer having a first side and a second side comprising a thermoplastic polymer and essentially no migratory slip agents, (ii) a functional layer on the first side of the core layer, wherein the functional layer is a printable layer or a laminatable layer; and (iii) a heat sealable skin layer on a second side of the core layer. The heat sealable skin layer may include a thermoplastic polymer and a slip system, wherein the thermoplastic polymer comprises at least 60 wt % of propylene derived units, and the slip system comprises at least one of (A) a silicone gum comprising less than or equal to 1500 ppmw of the sealant skin layer, (B) a wax which comprises less than or equal to 10 wt % of the sealant skin layer, or (C) a combination of the silicone gum and the wax, wherein the silicone gum comprises less than or equal to 1500 ppmw of the sealant skin layer and the wax comprises less than or equal to 10 wt % of the sealant skin layer. The sealant skin layer may have a kinetic coefficient of friction of the sealant skin layer to itself of less than or equal to 0.30 when measured in accordance to ASTM D1894 as described herein (using 200 g sled); and a minimum sealing temperature range from 185 of to less than or equal to 240° F. (85 to 116° C.) when measured in accordance to the MST test method described herein. The method further includes winding said multi-layer film onto a spool or roll in which at least a portion of the heat sealable layer is in contact with the functional layer. Essentially none of the slip system in the heat sealable skin layer is transferred to the functional layer during multi-layer film processing (e.g., winding/unwinding the multi-layer film on a spool or roll).

DETAILED DESCRIPTION OF THE INVENTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Core Layer

The core layer may include a thermoplastic polymer and essentially no migratory slip agents. The term "essentially no migratory slip agents" as used herein, means that no migratory slip agents, such as fatty amides, are intentionally added to the core layer. Accordingly, the present multi-layer film structure is preferably prepared without any migratory slip additives. Without migratory slip additives, the multi-layer film structure exhibits excellent machinability on typical packaging equipment.

In one or more embodiments, the core layer may include a polymeric matrix having a film-forming thermoplastic polymer which has properties suitable for extrusion or coextrusion followed by biaxial orientation in the machine and transverse directions under elevated temperature so as to form a biaxially-oriented film. The polymeric matrix may be a propylene homopolymer or a propylene copolymer, i.e., a polymer made predominantly of propylene with minor amounts of another olefin, usually a $C_2$-$C_4$ olefin. Alternatively, the core layer may have a polymeric matrix that comprises any polymer made from a $C_2$-$C_4$ olefin, such as ethylene or butene-1. For example, the core layer may have a polymeric matrix of high density polyethylene (HDPE).

The core layer may optionally include from about 2 to about 10 wt % of a cavitating agent to form a white opaque, coextruded, heat sealable film. The cavitating agent may be any material, which is capable of cavitating the core layer without causing degradation to the film material. Examples of cavitating agents include polybutylene terephthalate, calcium carbonate, nylon, solid or hollow pre-formed glass spheres, metal beads or spheres, ceramic spheres, talc, chalk, cyclic olefinic copolymers (COC), or combinations thereof. Cavitation may also be introduced by beta-cavitation, which includes creating beta-form crystals of polypropylene and converting at least some of the beta-crystals to alpha-form polypropylene crystals and creating a small void remaining after the conversion. Preferred beta-cavitated embodiments of the core layer may also comprise a beta-crystalline nucleating agent. Substantially any beta-crystalline nucleating agent ("beta nucleating agent" or "beta nucleator") may be used. The average diameter of the void-initiating particles typically may be from about 0.1 to 10 microns. U.S. Pat. No. 5,691,043 contains a more detailed discussion of cavitating agents.

The core layer may also include a hydrocarbon additive to improve barrier characteristics of the film, such as, for example, water vapor and oxygen barrier characteristics. The hydrocarbon additive may be present in an amount of up to about 9 wt %, based on the entire weight of the core layer. The hydrocarbon additive may be a low molecular weight, hydrogenated hydrocarbon which is compatible with the thermoplastic polymer of the core layer and which provides the desired enhancement of film properties. The hydrocarbon additive may have a number average molecular weight less than about 5,000, for example, less than about 2,000, e.g., from about 500 to about 1,000.

The hydrocarbon additive may be natural or synthetic and may have a softening point of from about 60° C. to about 180° C. Hydrocarbon resins are examples of suitable hydrocarbons, which may be subsequently hydrogenated. Examples of hydrocarbon resins include petroleum resins, terpene resins, styrene resins, and cyclopentadiene resins. U.S. Pat. No. 5,667,902 contains a more complete discussion on hydrocarbon additives.

Functional Layer

The functional layer may be a printable layer or a laminatable layer. The functional layer may include one or more polymers or copolymers having properties suitable for extrusion and uniaxial or biaxial orientation (by stretching the extrudate in the machine direction and/or transverse direction under elevated temperatures) and for forming skin layers on the outer surfaces of the core layer.

Suitable polymers include thermoplastic polymers, which are printable, sealable, or capable of being laminated with and without treatment. If the functional layer is to be sealed, the thermoplastic polymer may be selected from the group consisting of ethylene-propylene random copolymer, propylene-butylene copolymer, ethylene-propylene-butylene terpolymer, medium density polyethylene (MDPE), linear low density polyethylene (LLDPE), ethylene vinyl acetate (EVA), ethylene-methyl acrylate (EMA), and blends thereof. If the functional layer is to be printed and/or laminated, the thermoplastic polymer may be selected from the group consisting of propylene homopolymer, ethylene-propylene block copolymer, high density polyethylene (HDPE), ethylene vinyl alcohol copolymer (EVOH), ethylene-propylene random copolymer, propylene-butylene copolymer, ethylene-propylene-butylene terpolymer, MDPE, LLDPE, EVA, EMA, and blends thereof.

The functional layer may contain one or more antiblock additives used in amounts ranging from about 0.1 wt % to about 3 wt % based upon the entire weight of the functional layer. Antiblock additives include inorganic particulates such as silicon dioxide, e.g., a particulate antiblock sold by W. R. Grace under the trademark "SYLOBLOC 44", calcium carbonate, magnesium silicate, aluminum silicate, calcium phosphate, and, e.g., Kaopolite.

Another useful particulate antiblock agent is referred to as a non-meltable, crosslinked silicone resin powder, described in U.S. Pat. No. 4,769,418, sold by Toshiba Silicone Co., Ltd. under the trademark "TOSPEARL". Another useful antiblock additive is a spherical particle made from polymethyl methacrylate (PMMA) resin; it is sold under the trademark "EPOSTAR" and is commercially available from Nippon Shokubai.

Still another particulate antiblock agent is an amorphous silica particle; it is sold under the tradename of SEAHOSTAR and is commercially available from Nippon Shokubai.

The surface of the functional layer may be treated so as to provide or facilitate lamination or printing. This includes surface treatment of any kind known to enhance surface tension properties, such as flame, plasma or corona treatment, and combinations thereof, and other treatment methods, as described below.

When the functional layer is an EVOH laminating/print surface layer, surface treatment is not necessary, but a suitable tie layer may be used between the laminating/print functional layer and the core layer in order to achieve adequate skin adhesion. The EVOH laminating/print functional layer further enhances the oxygen barrier and flavor/aroma barrier properties of the multi-layer film.

Heat Sealable Skin Layer

The heat sealable skin layer may include one or more thermoplastic polymers and a slip system. Suitable thermoplastic polymers may have properties suitable for extrusion and uniaxial or biaxial orientation (by stretching the extrudate in the machine direction and/or transverse direction under elevated temperatures) and for forming skin layers on the outer surfaces of the core layer. Any known low temperature sealant resin may be used. Examples include ethylene-propylene random copolymer, propylene-butylene random copolymer, ethylene-propylene-butylene terpolymer, linear low density polyethylene (LLDPE), low density polyethylene (LDPE), metallocene-catalyzed polyethylenes, ethylene vinyl acetate (EVA), ethylene-methyl acrylate (EMA), ionomer (e.g., Surlyn from DuPont), or blends thereof. Generally, the surface of the heat sealable skin layer is untreated, but it may optionally be treated.

In one or more embodiments, the heat sealable layer may include a thermoplastic polymer having at least 60 wt % of propylene derived units. The thermoplastic polymer may have at least 70 wt % of propylene derived units, and preferably at least 80 wt % of propylene derived units. In one or more embodiments, the heat sealable layer may include a thermoplastic polymer having 60 to 80 wt % of propylene derived units or 65 to 75 wt % of propylene derived units.

Slip System

The slip system may include a silicone gum, a wax, or a combination of a silicone gum and a wax. In at least one specific embodiment, the slip system may include at least one of: (A) a silicone gum comprising less than or equal to 1500 ppmw of the sealant skin layer, (B) a wax which comprises less than or equal to 10 wt % of the sealant skin layer, or (C) a combination of the silicone gum and the wax, wherein the silicone gum comprises less than or equal to 1500 ppmw of the sealant skin layer and the wax comprises less than or equal to 10 wt % of the sealant skin layer.

In one or more embodiments, the silicone gum may be present in an amount less than or equal to 1300 ppmw of the sealant skin layer, or less than or equal to 1200 ppmw of the sealant skin layer, or less than or equal to 1100 ppmw of the sealant skin layer, or less than or equal to 1000 ppmw of the sealant skin layer, or less than or equal to 850 ppmw of the sealant skin layer, or less than or equal to 750 ppmw of the sealant skin layer, or less than or equal to 500 ppmw of the sealant skin layer.

In one or more embodiments, the wax may be present in an amount less than or equal to 10 wt % of the sealant skin layer, or less than or equal to 9 wt % of the sealant skin layer, or less than or equal to 8 wt % of the sealant skin layer, or less than or equal to 7 wt % of the sealant skin layer, or less than or equal to 6 wt % of the sealant skin layer, or less than or equal to 5 wt % of the sealant skin layer, or less than or equal to 4 wt % of the sealant skin layer, or less than or equal to 3 wt % of the sealant skin layer, or less than or equal to 2 wt % of the sealant skin layer, or less than or equal to 1 wt % of the sealant skin layer.

In one or more embodiments, the slip system may include a combination of the silicone gum and the wax where the silicone gum comprises less than or equal to 1300 ppmw of the sealant skin layer and the wax comprises less than or equal to 9 wt % of the sealant skin layer. In one or more embodiments, the slip system may include a combination of the silicone gum and the wax where the silicone gum comprises less than or equal to 1200 ppmw of the sealant skin layer and the wax comprises less than or equal to 8 wt % of the sealant skin layer. In one or more embodiments, the slip system may include a combination of the silicone gum and the wax where the silicone gum comprises less than or equal to 1300 ppmw of the sealant skin layer and the wax comprises less than or equal to 5 wt % of the sealant skin layer. In one or more embodiments, the slip system may include a combination of the silicone gum and the wax where the silicone gum comprises less than or equal to 1000 ppmw of the sealant skin layer and the wax comprises less than or equal to 9 wt % of the sealant skin layer. In one or more embodiments, the slip system may include a combination of the silicone gum and the wax where the silicone gum comprises less than or equal to 1000 ppmw of the sealant skin layer and the wax comprises less than or equal to 6 wt % of the sealant skin layer.

Silicone gums are not flowable at room temperature, whereas silicone oils are flowable fluids at room temperature. Silicone gums may have the consistency of tough putty or hard deformable plastic. Silicone gums may have a Durometer hardness of at least about 5 or a penetration number of about 1500 or less. Penetration number is used to describe the hardness or viscosity of asphalt or bitumen and other substances of similar consistency, with higher values denoting softness or lower viscosity: Corbett, L. W. and R. Urban (1985), Asphalt and Bitumen, Ullmann's Encyclopedia of Industrial Chemistry, W. Gerhartz, Deerfield Beach Fla., USA, VCH Publishers, A.3: 163-188.

The viscosity of silicone gum may exceed 106 cSt, for example, the viscosity of silicone gum may be from about 10 to about 20 million cSt, e.g., about 15 million cSt. Silicone gums may have a Williams plasticity (ASTM D 926) of at least 95.

The high molecular weight and high viscosity of silicone gum impede it from migrating throughout the multi-layer film structure or from surface to surface. Thus, silicone gum displays less of a transfer effect, which lends the multi-layer film improved converting properties. When properly blended and extruded with the polymer of the heat sealable skin layer, moreover, the silicone gum is evenly distributed throughout the polymer of the heat sealable skin layer.

The silicone gum may be in the form of a silicone polymer dispersed in polypropylene or polyethylene. Ultra-high molecular weight silicone gum of this kind is available in masterbatch form from the Dow Corning Corporation, of Midland, Mich., under the product designations "MB50-001" and "MB50-002".

In at least one specific embodiment, the silicone gum may be a high-viscosity polydialkyl siloxane compound. An example of a high-viscosity polydialkyl siloxane compound is $HOMe_2SiO(Me_2SiO)_nSiMe_2OH$, in which Me is methyl and n is an integer having a value which may be as much as 10,000.

In at least one specific embodiment, the wax may be a polyethylene wax, an ethylene-propylene copolymer wax (e.g., Baker Petrolite EP1100 Wax), a paraffin wax, a microcrystalline wax (e.g. Baker Petrolite Bareco Be Square 195 Wax or Honeywell Astor Wax 9508), a beeswax, a carnauba wax, a montan wax, a candelilla wax, a synthetic wax, or mixtures thereof.

Anti-Blocking Agents

The slip system may also include one or more antiblocking agents. Suitable agents may include EPOSTAR™, a PMMA organic antiblock (available from Nippon Shokubai); TOSPEARL™, a cross-linked polymonoalkylsiloxane antiblock; SEAHOSTAR™, or any other agent capable of providing an excellent surface modification for improved COF and machinability.

In one or more embodiments, the antiblocking agent may be included in the heat sealable skin layer of the multi-layer film structure in an amount of from about 0.05 to about 0.5 wt %, based on the entire weight of the heat sealable skin layer. It has been determined that the combination of the quantity and particle size of the antiblock agent and the thickness of the layer in which it is added is important for obtaining acceptable COF values. Therefore, the average antiblock particle size may vary. For example, the average antiblock particle size may be in the range of from about 1 to about 5 μm, preferably from about 2 to about 3 μm; more preferably, about 1.5 μm for a sealant skin thickness of 0.6 μm.

By employing sufficient amounts of the silicone gum in the heat sealable skin layer, a multi-layer film structure is provided that (i) exhibits excellent COF, hot slip, and machinability even after printing and laminating, (ii) exhibits excellent ink adhesion and bond strengths in lamination, (iii) functions very well as both an inside or an outside web in a lamination, and (iv) may be prepared without migrating additives that require aging after production.

Method for Making Multi-Layer Film

In general, the multi-layer film structure may include at least three layers: the core layer; the heat sealable skin layer (an outermost skin layer); and the functional layer (an outermost skin layer). It is contemplated that additional layers may be incorporated between the core layer and the outermost skin layers, e.g., tie layers comprising polypropylene or polyethylene. The skin layers are usually coextensively applied to each major surface of the core layer, typically by coextrusion, as noted above.

The multi-layer film structure may also be formed by coextruding the core layer together with the heat sealable skin layer and functional layer through a flat sheet extruder die at a temperature ranging from between about 200° C. to about 250° C., casting the multi-layer film onto a cooling drum and quenching the multi-layer film.

The embodiments of this invention include possible uniaxial or biaxial orientation of the multi-layer films. Orientation in the direction of extrusion is known as machine direction (MD) orientation. Orientation perpendicular to the direction of extrusion is known as transverse direction (TD) orientation. Orientation may be accomplished by stretching or pulling a film first in the MD followed by TD orientation. The sheet may then be stretched about 3 to about 7 times in a machine direction (MD) orienter followed by stretching about 5 to about 10 times in the transverse direction (TD) orienter. Blown films or cast films may also be oriented by a tenter-frame orientation subsequent to the film extrusion process, again in one or both directions. Orientation may be sequential or simultaneous, depending upon the desired film features. Preferred orientation ratios are commonly from between about three to about six times in the machine direction and between about four to about ten times the extruded width in the transverse direction. Typical commercial orientation processes are BOPP tenter process, blown film (e.g., bubble and double bubble processes), and the simultaneous stretching process (LISIM) technology.

The multi-layer film structure may then be wound onto a reel or spool. In one or more embodiments, the multi-layer film structure may be wound onto a reel or spool whereby at least a portion of the heat sealable layer is in contact with the functional layer and in which essentially none of the slip system is transferred from the heat sealant layer to the functional layer. The phrase "essentially none" when used herein in connection with the slip system means that any amount of the slip system that is transferred is very small or de minimus and does not effect the functionality of the functional layer.

Multi-Layer Film Thickness

The overall thickness of the multi-layer film structure may vary within wide limits and depends on the intended use. The core layer usually represents about 70 to about 90 percent of the thickness of the total multi-layer film. For example, the core layer may be from about 5 to about 50 μm thick, the functional layer may be from about 0.25 to about 3.0 μm thick, and the heat sealable skin layer may be from about 0.5 to about 7.0 μm thick.

Printing

In one or more embodiments, the multi-layer film structure described may be printed. Preferably, the functional layer of such multi-layer film structure is printed using a multi-color printing process ("MCPP") on a side of the core layer opposite the heat sealable skin layer. MCPP is well known in the art and typically includes a printing technology where colors are rendered by sequentially superimposing four or more distinct colored dots in a number of channels. In a traditional 4-colorant print process, the colorants used are cyan (C), magenta (M), yellow (Y) and black (K). Prior art slip multi-layer films that use non-migratory slip additives have been suitable for this process.

In one 7-color MCCP, additional red (R), green (G), and blue (B) colorants are added to the CMYK colorants. The attributes of a high quality MCPP are large color gamut (e.g., large color space) and small error when matching individual color targets. Seven-color multi-color print processes are described in U.S. Pat. No. 5,751,326 to Bernasconi, U.S. Pat. Nos. 4,812,899 and 4,878,977 to Kueppers, all of which are incorporated herein by reference. In 7-colorant MCPP, the inventive multi-layer films provide acceptable slip properties as well as acceptable sealing, printing and lamination characteristics, because essentially none of the slip system is transferred to the functional layer during multi-layer film processing. The prior art slip multi-layer films are deficient in these properties and characteristics.

Lamination

In one or more embodiments, the multi-layer film structure described may be laminated to the substrate. Preferably, the substrate is laminated to the functional layer on a side of the multi-layer film structure opposite the heat sealable skin layer. The substrate is adhered to the multi-layer film structure by extrusion or adhesive lamination on the functional layer opposite the heat sealable skin layer.

The substrate may be paper, single-layer film or the inventive multi-layer film described herein. An example of a laminate structure may be a structure which, from top to bottom, comprising: a heat sealable skin layer; a core layer, a functional layer with a substrate laminated thereto. Prior to lamination, the functional layers and/or substrate may be printed on.

Extrusion lamination with polyethylene or polypropylene may be employed to produce the desired lamination of the inventive multi-layer film. In extrusion lamination, an adhesive layer may be co-extruded on the functional layer side of the inventive multi-layer films structure, and the adhesive layer is thereafter laminated to the substrate. Alternatively, the adhesive layer may be co-extruded on the substrate, and the adhesive layer is thereafter laminated to the substrate.

A laminated structure may be produced by other methods, such as adhesive lamination, wherein an adhesive layer or adhesive coating is used to adhere the functional layer of the inventive multi-layer film to a substrate. Laminating methods that may be adapted for use with the multi-layer films of the present invention are described, for example, in U.S. Pat. Nos. 4,916,025, 5,223,346, 5,302,442, 5,500,283, and 5,527,608, incorporated herein by reference.

Surface Treatments

In one or more embodiments, the multi-layer film structure described may be subjected to one or more surface treatments and/or metallization treatments. For example, one or both of the outer surfaces of the multi-layer film structure may be metallized. Such surfaces may be metallized using conventional methods, such as vacuum metallization by deposition of a metal layer such as aluminum, copper, silver, chromium, or mixtures thereof.

In one or more embodiments, one or more top coatings, such as for barrier, printing and/or processing, may be applied to an outermost surface of the multi-layer film structure. Such top coatings may include acrylic polymers, such as ethylene acrylic acid (EAA), ethylene methyl acrylate copolymers (EMA), polyvinylidene chloride (PVdC), poly(vinyl)alcohol (PVOH) and EVOH. The coatings are preferably applied by an emulsion coating technique, but may also be applied by co-extrusion and/or lamination.

The PVdC coatings that are suitable for use with the inventive multi-layer film structure are any of the known PVdC compositions heretofore employed as coatings in multi-layer film manufacturing operations, e.g., any of the PVdC materials described in U.S. Pat. No. 4,214,039, U.S. Pat. No. 4,447,494, U.S. Pat. No. 4,961,992, U.S. Pat. No. 5,019,447, and U.S. Pat. No. 5,057,177, incorporated herein by reference.

Known vinyl alcohol-based coatings, such as PVOH and EVOH, that are suitable for use with the multi-layer films invention include VINOL™ 125 or VINOL™ 325 (both commercially available from Air Products, Inc. of Allentown, Pa.). Other PVOH coatings are described in U.S. Pat. No. 5,230,963, incorporated herein by reference.

Before applying a top coating, to the outer surface, the surface to be coated may be treated to increase its surface energy. For example, the multi-layer film may be treated using flame treatment, plasma, corona discharge, film chlorination (e.g., exposure of the multi-layer film surface to gaseous chlorine), treatment with oxidizing agents such as chromic acid, hot air or steam treatment, flame treatment and the like, and any combination thereof. Although any of these techniques may be effectively employed to pre-treat the multi-layer film surface, a frequently preferred method may be corona discharge, an electronic treatment method that includes exposing the multi-layer film surface to a high voltage corona discharge while passing the multi-layer film between a pair of spaced electrodes.

In one or more embodiments, a primer coating may be applied as a top coating to one or more surfaces of the multi-layer film structure. Such primer materials are well known in the art and include, for example, epoxy and poly(ethylene imine) (PEI) materials. U.S. Pat. No. 3,753,769, U.S. Pat. No. 4,058,645 and U.S. Pat. No. 4,439,493, each incorporated herein by reference, disclose the use and application of such primers. The primer provides an overall adhesively active surface for thorough and secure bonding with a subsequently applied layer or coating and may be applied to a substrate by conventional solution coating means, for example, by roller application.

Properties and Test Procedures

In one or more embodiments, the heat sealable skin layer may have a kinetic coefficient of friction with the sealant skin layer of less than or equal to 0.30. Preferably, the kinetic coefficient of friction is less than 0.25, less than 0.20, less than 0.17, less than 0.15, less than 0.12, or less than 0.10. In one or more embodiments, the kinetic coefficient of friction may range from a low of about 0.05, 0.10, or 0.15 to a high of about 0.17, 0.20, or about 0.20.

The coefficient of friction (COF) may be determined following ASTM 1894 with 25 seconds of measurement time using a TMI Model 32-06 lab slip and friction testing equipment (commercially available from Testing Machines Inc. of Ronkonkoma, N.Y.). A 200 g sled comprised of 3/16 inch sponge rubber with 17-24 psi compressibility is preferred.

In one or more embodiments, the heat sealable skin layer has a minimum sealing temperature (MST) of greater than 90° C., greater than 95° C., greater than 100° C., greater than 105° C., greater than 115° C. of about 185° F. to 240° F. (85° C. to 116° C.). The minimum sealing temperature may range from about 75° C. to 125° C. Preferably, the minimum sealing temperature may range from about 85° C. to 116° C. More preferably, the minimum sealing temperature may range from about 92° C. to 105° C.

The MST may be determined from a heat seal that is formed at temperatures that are raised incrementally. Any commercially available heat sealer may be used, such as the LAKO™ Heat Sealer (Model SL-10) (commercially available from Lako Tool & Manufacturing, Inc. of Perrysburg, Ohio), the RDM Laboratory Heat Sealer Model HT-1000 (commercially available from RDM Test Equipment Co. of Hertfordshire, United Kingdom), FUJI™ Heat Sealer, and BRUGGER™ Dynamometer/Heat Sealer (Model HSG-C) (commercially available from Brugger Feinmechanix GmbH of Munich, Germany). The minimum seal temperature is reached when one temperature yields a seal value of less than a specified g/cm peel force and the next temperature yields a seal value of greater than or equal to the specified g/cm peel force. Using the RDM Laboratory Heat Sealer Model HT-1000, for example, the temperatures may be increased from 45 to 85° C., in 5° C. increments. The specified peel force of a LAKO™ Heat Sealer and a FUJI™ Heat Sealer is from 200 g/1 in (78.8 g/cm). For a BRUGGER™ Heat Sealer, the specified peel force is 300 g/cm.

MST may also be evaluated on a HFFS packaging machine operating at a fixed packaging speed. MST of a seal formed using a Jaguar Record Model HFFS packaging machine (commercially available from Jaguar Packaging Systems, Inc. of Lewiston, N.Y.) may be determined as follows: a multi-layer film or multi-layer film lamination is placed on the machine. The Jaguar Record machine is operated at 76 m/min (250 ft/min). The pressure applied by the jaws of the Jaguar Record machine when making seals increases as the thickness of the multi-layer film increases. Packages are formed having one or more heat seals and may or may not contain a product. The minimum seal temperature of the packages form is then determined in accordance with the methods described above.

When the multi-layer film passes through the forming collar region of a commercial form, fill and seal machine, for example, a Mira-Pak Miramatic Model L, described below, a "force over forming collar" (FOFC) value can be obtained. This value is obtained by measuring the drag force in pounds revealed by manually pulling the multi-layer film through the forming collar region. The force in pounds can be obtained by employing a simple spring resistance scale having a hook at one end. The multi-layer film is gathered or affixed to the hook and the multi-layer film pulled through the forming collar region while reading the drag force in pounds. Depending upon multi-layer film gauge, a high or low reading will indicate poor or good "machineability" respectively.

In one or more embodiments above or elsewhere herein, the heat sealable skin layer may have a force of less than or equal to 35 pounds over a packaging machine forming collar when measured in accordance with FOFC test described herein. The force may be less than or equal to 30 pounds; preferably, less than or equal to 25 pounds; more preferably, less than or equal to 20 pounds. In one or more embodiments, the force may range from a low of about 10 pounds; preferably, from a low of about 7 pounds; more preferably, from a low of about 5 pounds. In one or more embodiments, the force may range from a high of about 20 pounds, 25 pounds, or 30 pounds.

The Force Over Forming Collar test ("FOFC test") is described as follows: The FOFC test may be conducted using a Mira-Pak Miramatic Model L—Vertical Form Fill and Seal (VFF&S) packaging machine equipped with a 2" OD idler roll assembly with ball bearings, a force gauge with 0-50 lbs range in 1 lb increments, and a cutting device for roll changes. Such machine may be obtained from J&J Manufacturing Company, Inc. of Beaumont, Tex. The machine conditions are set at 90 PSI dial pressure.

Each sample to be tested should be contamination free, which means that no silicone oils or sprays or any other substance are applied to the equipment to assist the performance of the multi-layer film. Isopropyl alcohol or similar substance may be used to clean dirt and grime off of collars, formers, rollers, etc. The idler roll assembly should be attached onto the machine base under the crimp jaw section of machine. The sample is then mounted so that the proper surface to be tested is unwound properly. For example, for an "off the top" measurement, the inside surface of the multi-layer film contacts the forming collar. For an "off the bottom" measurement, the outside surface contacts the forming collar.

Once mounted, the roll should be secure to the unwind shaft. It is critical that the test roll does not slip on the shaft. Adjust, if needed, the roller assembly prior to the forming collar to ensure the angle of the multi-layer film is tangent and in complete contact with the forming collar. Adjust brake tension as required to ensure the dancer bar lifts no more than 10" off the machine base during each test. Loop the tube of multi-layer film as close to the idler as possible and attach force gauge. With the force gauge in hand, pull the multi-layer film through the machine while walking backwards between 14-16 feet. The force gauge should be held waist high (approximately 36 inches from ground level at a 30° angle as it exits the idler). It is important that each pull is smooth and at a steady rate of speed. During the pull, the peak value indicated on the gauge is recorded in lbs pull.

In one or more embodiments of this invention, the bond strength between the functional (print or laminatable) layer of the multi-layer film and the adhesive layer used to adhere the multi-layer film to another substrate is at least 50 g/in or more. The adhesive layer may be a polymer, such as low density polyethylene (e.g. Chevron Chemical 1017), or any other suitable adhesive. The bond strength between the sealant skin layer and the heat sealable skin layer is preferably at least 55 g/in or more, or at least 60 g/in or more, or at least 65 g/in or more, or at least 70 g/in or more, or at least 80 g/in or more, or at least 90 g/in or more, or at least 100 g/in or more. As used herein, the term "bond strength" refers to the amount of force that is required to separate layers in a lamination. High bond strength is important when the inventive multi-layer film is laminated to another substrate. It has been determined that poor lamination bond strengths result when silicone gum transfers to a functional layer comprised of ethylene-propylene copolymer resin.

Bond strength may be measured by cutting a one inch wide strip from a laminate structures and peeling the primary web and the secondary web apart at 12 inches/min. and 90 degrees peel angle on an Instron tensile tester (commercially available Instron Worldwide Headquarters, Norwood, Mass.). The bond strength is the average peel force measured by the test.

Seal strength, on the other hand, refers to the amount of force that is required to open a seal. The seal strength of hermetic seals formed from flexible barrier materials may be determined according to the standard testing method of ASTM F 88-06.

EXAMPLES

The foregoing discussion may be further described with reference to the following non-limiting examples. Examples 1-10 were performed to show multi-layer film machinability characteristics. Examples 1-6 were comparative examples. Examples 7-10 were in accordance with one or more embodiments of the invention.

As shown in Table 1, Examples 1-5 and 7-10, the Homopolymer resin used in the core layer was Total 3371, a PP homopolymer. In Example 6, the Homopolymer resin used in the core layer was ExxonMobil 4612, a polypropylene (PP) homopolymer. The silicone gum was MB50-001 (commercially available from Dow Corning Corporation), a masterbatch which contains 50 wt % silicone gum and 50 wt % of propylene homopolymer. The wax was Bareco Be Square 195 (commercially available from Baker-Petrolite Corporation), a microcrystalline wax. The antiblock additive was SEAHOSTAR KEP150 (commercially available from Nippon Shokubai). SEAHOSTAR KEP150 is comprised of amorphous silica particles.

In Examples 1 and 3-6, the Terpolymer resin in the sealant skin was Chisso 7790 (commercially available from Chisso Corporation, now know as Japan Polypropylene Corporation), an ethylene-propylene-butylene (EPB) terpolymer.

In Example 2, the Homopolymer resin in the sealant skin was ExxonMobil 4712 (commercially available from ExxonMobil Chemical Company), a PP homopolymer.

In Examples 7-10, the r-Copolymer resin in the sealant skin was Total EOD94-21 (commercially available from Total S.A.), a random ethylene-propylene (EP) copolymer.

In the print/lamination skin (functional layer) of Examples 1-10, the Copolymer was Total 8573HB (commercially available from Total S.A.), an ethylene-propylene (EP) copolymer, and the HDPE was Equistar 6030B (commercially available from Equistar Chemicals), a high-density polyethylene homopolymer.

TABLE 1

Slip system composition

| Example | Sealant Skin Layer Resin | Silicone Gum (wt %) (MB50-001) | Wax (wt %) (Be Square 195) | Antiblock (wt %) (Seahostar KEP150) | Print/Lamination Skin Resin (Functional Layer) | Core Layer Resin |
|---|---|---|---|---|---|---|
| 1 | Terpolymer | 0.60% | 0 | 0.35% | Copolymer | Homopolymer |
| 2 | Homopolymer | 0.30% | 0 | 0.35% | Copolymer | Homopolymer |
| 3 | Terpolymer | 0.60% | 0 | 0.35% | HDPE | Homopolymer |
| 4 | Terpolymer | 0.30% | 0 | 0.35% | HDPE | Homopolymer |
| 5 | Terpolymer | 0 | 0 | 0.35% | Copolymer | Homopolymer |
| 6 | Terpolymer | 0 | 5% | 0.35% | HDPE | Homopolymer |
| 7 | r-Copolymer | 0 | 5% | 0.35% | HDPE | Homopolymer |
| 8 | r-Copolymer | 0.05% | 5% | 0.35% | HDPE | Homopolymer |
| 9 | r-Copolymer | 0.15% | 0 | 0.35% | HDPE | Homopolymer |
| 10 | r-Copolymer | 0 | 5% | 0.35% | Copolymer | Homopolymer |

Table 2 below shows the machinability of the multi-layer films of Examples 1-10 using a Mira-Pak VFF&S packaging machine, described above. The Force Over Forming Collar (FOFC) test was measured according to the FOFC test procedure described above. The coefficient of friction (COF) was measured according to ASTM D1894, described above. The minimum sealing temperature (MST) was measured using a LAKO™ Heat Sealer (Model SL-10), described above.

TABLE 2

Multi-layer Film Machinability

| Example | Printing Performance | Lamination Bonds | Packaging Performance | FOFC (pounds) | COF | MST (° F.) |
|---|---|---|---|---|---|---|
| 1 | Poor | Poor | Excellent | 20 | 0.20 | 199 |
| 2 | Excellent | Excellent | Poor | 17 | 0.24 | >260 |
| 3 | Poor | Excellent | Excellent | 16 | 0.22 | 209 |
| 4 | Poor | Excellent | N/A | N/A | N/A | N/A |
| 5 | Excellent | Excellent | Poor | 50+ | 0.20 | 201 |
| 6 | Excellent | Excellent | Fair | 40 | 0.36 | 196 |
| 7 | Excellent | Excellent | Good | 26 | 0.22 | 227 |
| 8 | Excellent | Excellent | Good | 26 | 0.21 | 228 |
| 9 | Excellent | Excellent | Good | 24 | 0.22 | 227 |
| 10 | Excellent | Excellent | Good | 30 | 0.27 | 227 |

The data in Table 2 reveals that Example 1 shows poor lamination bonds and poor printability due to silicone gum transfer from the sealant skin layer to the Copolymer in the print/lamination (functional layer) skin layer. Extrusion lamination bonds were <50 g/in and printing resulted in pin-holes and low ink density.

Example 2 shows that changing the sealant resin to a Homopolymer resolves the silicone gum transfer issues, but the sealability of the homopolymer was poor.

Example 3 shows that changing the print/lamination (functional layer) skin layer resin to HDPE resolves the poor lamination bonds, but the printing still had pin holes and low ink density.

Example 4 shows that halving the amount of silicone gum in the sealant skin layer did not improve the print performance.

Example 5 shows that removing all of the silicone gum in the sealant skin layer will result in excellent print and lamination performance. However, slip properties over a forming collar are poor.

Example 6 shows that using wax instead of silicone gum will begin to improve the slip performance, but not sufficiently for many packaging applications.

Example 7 shows that increasing the MST of the sealant resin will improve the slip performance of the sealant skin layer sufficiently to provide good packing performance.

Example 8 shows that alternatively 0.05% silicone gum in combination with wax will maintain good printing and packaging performance.

Example 9 shows that alternatively 0.15% silicone gum is sufficient to provide good slip performance without negatively impact printing performance.

Example 10 shows that alternatively with wax and no silicone gum in the sealant skin layer, a Copolymer resin may be used for the print/lamination (functional) layer.

Table 3 below shows the structure for the multi-layer films of Examples 11-14. Example 11 was a comparative example. Examples 12-14 were in accordance with one or embodiments of the invention.

In Example 11, a migratory fatty acid amide was used in the core layer. The multi-layer film structure for Example 11 was not known.

In Examples 12-14, the r-Copolymer resin used in the sealant skin layer was Total EOD94-21, a random EP copolymer. The Homopolymer resin used in the core layer was Total 3371 (commercially available from Total S.A.), a PP homopolymer.

In the print skin (functional layer) of Examples 12-14, the Copolymer was Total 8573HB, an EP copolymer, and the HDPE was Equistar 6030B.

The silicone gum was MB50-001. The wax was Bareco Be Square 195. The antiblock additive was SEAHOSTAR KEP150.

In Examples 12-14, the antiblock (SEAHOSTAR KEP150) content was 0.35 wt %.

In Example 12, the silicone gum (MB50-001) content was 0.15 wt % and no wax additive was used.

In Example 13, the wax (BE Square 195) content was 5 wt % and no silicone gum additive was used.

In Example 14, the silicone gum (MB50-001) content was 0.05 wt % and the wax content was 5.0 wt %.

TABLE 3

Structure and Resins for Multi-layer Films in Table 4

| Example | Sealant Resin | Silicone Gum (wt %) (MB50-001) | Wax (wt %) (Be Square 195) | Antiblock (wt %) (Seahostar KEP150) | Print Skin Resin (Functional Layer) |
|---|---|---|---|---|---|
| 11 | Fatty acid amide in core - Multi-layer film structure not known | | | | |
| 12 | r-Copolymer | 0.15% | 0 | 0.35% | HDPE |
| 13 | r-Copolymer | 0.00% | 5 | 0.35% | Copolymer |
| 14 | r-Copolymer | 0.05% | 5 | 0.35% | HDPE |

Table 4 below shows the data for the color gamut size and the color accuracy of the multi-layer films of Examples 11-14 when printed using a 7-colorant MCPP. The experimental procedure was as follows.

The multi-layer film samples were printed using a 7-colorant MCPP on a conventional flexographic press. The images that were printed comprised 7-color profile targets which were then measured with a spectrophotometer, such as an Eye One Pro (obtained from X-Rite, Inc.) to obtain spectral data for each of the 6000 color patches in the profile target.

The spectral data was converted into XYZ tristimulus values using the color matching functions taught in the literature. For each multi-layer film identified in Table 3, the tristimulus values thus obtained were then used to create a color space model for that particular substrate when imaged using the 7-colorant MCPP system and the conventional flexographic press selected for the test.

The color reproduction performance of the four multi-layer films was then calculated from their corresponding color space models. Because the multi-layer films are intended to print packaging, a standard set of spot colors used in packaging (for example the Pantone color system) is a useful basis for making this comparison.

For purposes of this test, we calculated two color reproduction metrics for each of the multi-layer films. The first metric is simply the percentage of the standard spot color set which is inside the boundaries of the film's color space model. The second metric is defined as the percentage of standard spot colors which could be reproduced with a color error of 2 deltaE2000 or less using one of the multi-layer films in combination with the 7-colorant MCPP system and flexographic press chosen for this test. (For an explanation of CIEDE2000 (referred to herein as "deltaE2000"), see "The Development of the CIE 2000 Colour Difference Formula: CIEDE2000", by M. R. Luo, G. Cui, and B. Rigg, published in Volume 26, Number 5, of Color Research & Application, October 2001, Wiley Periodicals, Inc. the contents are incorporated herein by reference.)

TABLE 4

Color Properties of Multi-layer Films Without UV-stabilized Paper Backing

| Example | Slip System | Gamut size (%) | Spot Colors which are Less than 2 deltaE2000 of Target Color (%) |
|---|---|---|---|
| 11 | Fatty Amide (migratory slip agent) | 84.23 | 59.87 |
| 12 | 1500 ppmw silicone gum | 83.98 | 59.87 |

TABLE 4-continued

Color Properties of Multi-layer Films Without UV-stabilized Paper Backing

| Example | Slip System | Gamut size (%) | Spot Colors which are Less than 2 deltaE2000 of Target Color (%) |
|---|---|---|---|
| 13 | 5 wt % Wax | 83.90 | 59.27 |
| 14 | 5 wt % wax + 500 ppmw silicone gum | 83.31 | 60.79 |

In Table 4 above, the data show that Examples 11-14 achieve the same color gamut size (within the error of the test). A color gamut size 82-84% is acceptable for a MCPP color reproduction system (comprised of a substrate, a set of colorants, a press, and image separation technology). Also, the data show that when using only the colorants of the 7-color MCPP color reproduction system, about 60% of the spot colors can be achieved within a color error of 2 deltaE2000 from the target color. There was no difference found among the samples (within the error of the test), and 60% is acceptable for a MCPP. The data supports the conclusion that the invention can achieve an appropriate gamut size and spot color matching, and does so without using a migratory slip additive.

Table 5 below shows the structure for the multi-layer films of Examples 15-19. Example 15 was a comparative example. Examples 16-19 were in accordance with one or embodiments of the invention.

In comparative Example 15, a multi-layer film that displayed "good print" quality, the Copolymer resin in the sealant layer was ExxonMobil 4712, a PP homopolymer. The silicone gum (MB50-001) content was 0.35 wt %, the antiblock (SEAHOSTAR KEP150) content was 0.017 wt % and there was no wax.

In Examples 16-19, the Terpolymer resin of the sealant skin was Chisso 7510, an ethylene-propylene-butylene (EPB) terpolymer; the antiblock (TOSPEARL™ T120) content was 0.35 wt %; the HDPE resin of the print (functional) layer was Equistar 6030B; and the Homopolymer of the core layer was Total 3371, a PP homopolymer.

In Example 16, there was no silicone gum (MB50-001) and the wax (Be Square 195) content was 5 wt %.

In Example 17, the silicone gum (MB50-001) content was 0.75 wt % and there was no wax.

In Example 18, the silicone gum (MB50-001) content was 0.15 wt % and there was no wax.

In Example 19, the silicone gum (MB50-001) content was 0.625 wt % and there was no wax.

TABLE 5

Multi-layer Film Structures and Resins

| Example | Sealant Layer Resin | Silicone Gum (wt %) (MB50-001) | Wax (wt %) (Be Square 195) | Antiblock (wt %) | Print Skin Resin (Functional Layer) | Core Layer Resin |
|---|---|---|---|---|---|---|
| 15 (Comp.) | Copolymer | 0.35 | 0 | 0.017 | Terpolymer | Homopolymer |
| 16 | Terpolymer | 0.00 | 5 | 0.35 | HDPE | Homopolymer |
| 17 | Terpolymer | 0.075 | 0 | 0.35 | HDPE | Homopolymer |
| 18 | Terpolymer | 0.15 | 0 | 0.35 | HDPE | Homopolymer |
| 19 | Terpolymer | 0.625 | 0 | 0.35 | HDPE | Homopolymer |

Table 6 below shows the data for color printing control of the comparative and inventive multi-layer films of Examples 15-19. The experimental procedure was as follows.

The multi-layer films for Examples 15-19 were printed using a 4-color MCPP, using CMYK colorants. Each of the 4 colors was printed using a 30% dot size. Individual dots were measured and their area was determined using a computer software program (Verity IA Color Image Analysis software, commercially available from Verity IA, LLC).

TABLE 6

Dot Area (30% Dot)

| | Ink Coverage (Number of Pixels) | | | |
|---|---|---|---|---|
| Example | Black | Cyan | Magenta | Yellow |
| 15 | 13380 | 12489 | 12990 | 11067 |
| 16 | 12830 | 12497 | 13009 | 11157 |
| 17 | 12388 | 12315 | 12557 | 9897 |
| 18 | 12419 | 12060 | 12061 | 9106 |
| 19 | 10021 | 13002 | 12406 | 8660 |

The ink coverage data in Table 6 refer to the area of a 30% dot; however, these data are dimensionless, because the computer program used to evaluate ink coverage measures the number of "pixels" where there is ink. The greater the number of pixels, the greater the area of the dot. The greater the area of the dot, the better the printing surface for that specific colorant.

Since MCPP uses dots that are overlayed, if dot areas are not consistent, color matching is poor and specific colors cannot be reproduced with enough accuracy, as shown in the data relating to the percentage of spot colors achieved in Table 4.

The "good print control" in Example 15 of Table 5 is like Example 2 in Table 1, in that the silicone gum does not interfere with dot area, since the silicone gum essentially does not transfer from the Homopolymer skin unto the functional (print) surface.

Examples 17-19 in Table 6 show that the presence of silicone on the print layer (functional layer) surface of the multi-layer film (which is due to transfer from the sealant skin layer surface of the film) results in lower dot size. As the concentration of silicone increases, dot size decreases with the black and yellow inks.

It has been determined that print control and quality for Examples 15-18 are acceptable and Example 19 is unacceptable. Therefore, with 6,250 ppmw of silicone gum, the contamination was too great that it was adversely affecting the print to an unacceptable level.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A heat sealable, multi-layer film structure for multi-color printing or lamination processes, comprising:
   (a) a core layer comprising a polypropylene homopolymer and essentially no migratory slip agents;
   (b) a functional layer on a side of the core layer, wherein the functional layer is a printable layer or a laminatable layer consisting of ethylene-propylene copolymer or high density polyethylene; and
   (c) a heat sealable skin layer consisting of a random ethylene-propylene copolymer on a side of the core layer opposite the functional layer, the heat sealable skin layer comprising the random ethylene-propylene copolymer and a slip system, wherein:
      (i) the random ethylene-propylene copolymer comprises from 60 wt % to 80 wt % of propylene derived units, and (ii) the slip system comprises from 0.05 to 0.5 wt % of an anti-block agent and:
  (A) a silicone gum comprising less than or equal to 1500 ppmw of the sealant skin layer,
  (B) a wax which comprises less than or equal to 7 wt % of the sealant skin layer, or
  (C) a combination of the silicone gum and the wax, wherein the silicone gum comprises less than or equal to 1500 ppmw of the sealant skin layer and the wax comprises less than or equal to 10 wt % of the sealant skin layer;
wherein essentially none of the slip system is transferred to the functional layer during multi-layer film processing; adhesively laminated to a substrate with an adhesive layer, where the adhesive layer is disposed on a side of the functional layer opposite the core layer; and
wherein a bond between the functional layer and the adhesive layer has a bond strength of at least 50 g/in or more.

2. The heat sealable, multi-layer film structure of claim 1, wherein the functional layer is:
  (a) printed with 4 or more colorants using a multi-color print process (MCPP), or
  (b) co-extruded with an adhesive layer on a side of the functional layer opposite the core layer, and the adhesive layer is laminated to a substrate.

3. The heat sealable, multi-layer film structure of claim 1, wherein the heat sealable skin layer has a kinetic coefficient of friction of the sealant skin layer to itself of less than or equal to 0.30 measured in accordance to ASTM D1894 as described herein (using 200 g sled).

4. The heat sealable, multi-layer film structure of claim 1, wherein the heat sealable skin layer has a minimum sealing temperature of the sealant skin layer to itself in a range from 185° F. to less than or equal to 240° F. (85 to 116° C.) measured in accordance to the MST test method described herein.

5. The heat sealable, multi-layer film structure of claim 1, wherein the heat sealable skin layer has a force of less than or equal to 35 pounds over a packaging machine forming collar measured in accordance with FOFC test described herein.

6. The heat sealable multi-layer film structure of claim 1, wherein the slip system consists essentially of silicone gum.

7. The heat sealable multi-layer film structure of claim 1, wherein the slip system consists essentially of wax.

8. The heat sealable multi-layer film structure of claim 1, wherein the slip system consists essentially of silicone gum and wax.

9. The heat sealable multi-layer film structure of claim 1, wherein the functional layer or heat sealable skin layer is subjected to a flame treatment, a corona discharge treatment, a plasma treatment, a metallization process, a coating process or combinations thereof.

10. The heat sealable multi-layer film structure of claim 1, further comprises a metal on the functional layer or heat sealable skin layer, wherein the metal is selected from the group consisting of aluminum, copper, silver, chromium, and mixtures thereof.

* * * * *